(12) United States Patent  
Satoh

(10) Patent No.: US 7,970,576 B2  
(45) Date of Patent: Jun. 28, 2011

(54) INFORMATION PROCESSING APPARATUS AND INFORMATION PROCESSING METHOD

(75) Inventor: Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 587 days.

(21) Appl. No.: 12/062,696

(22) Filed: Apr. 4, 2008

(65) Prior Publication Data

US 2008/0255789 A1     Oct. 16, 2008

(30) Foreign Application Priority Data

Apr. 12, 2007    (JP) .................................. 2007-105249

(51) Int. Cl.
*G01C 9/00* (2006.01)
*G01B 11/14* (2006.01)
*G06K 9/36* (2006.01)

(52) U.S. Cl. .......................... 702/153; 356/622; 382/291

(58) Field of Classification Search .................... 702/33, 702/81, 84–85, 94–95, 127, 150–153, 182–183, 702/189; 382/154, 276, 282, 284, 291, 295, 382/312–313, 318, 321; 356/614, 620, 622
See application file for complete search history.

(56) References Cited

U.S. PATENT DOCUMENTS

| 2005/0069196 | A1* | 3/2005 | Uchiyama et al. ............ 382/154 |
| 2005/0253871 | A1 | 11/2005 | Anabuki et al. ................ 345/633 |
| 2006/0227211 | A1 | 10/2006 | Kotake et al. .................. 348/141 |
| 2007/0092161 | A1 | 4/2007 | Aratani et al. |
| 2007/0139321 | A1 | 6/2007 | Takemoto et al. .............. 345/87 |
| 2007/0139322 | A1 | 6/2007 | Takemoto et al. .............. 345/87 |

FOREIGN PATENT DOCUMENTS

| JP | 2005-326275 | | 11/2005 |
| JP | 2006-292417 | | 10/2006 |
| JP | 2007-033257 | A | 2/2007 |

OTHER PUBLICATIONS

Satoh et al., A Head Tracking Method Using Bird's-Eye View Camera and Gyroscope, 2004, Proceedings of the Third IEEE and ACM International Symposium on Mixed and Augmented Reality (ISMAR 2004), 10 pp.*

Kotake, et al., "A Hybrid and Linear Registration Method Utilizing Inclination Constraint," Proc. of the International Symposium on Mixed and Augmented Reality, IEEE (ISMAR'05), 2005.

K. Satoh, S. Uchiyama, H. Yamamoto, and H. Tamura, "Robust vision-based registration utilizing bird's-eye view with user's view," Proc. 2nd IEEE/ACM Int'l Symp. on Mixed and Augmented Reality (ISMAR 2003), pp. 46-55, Oct. 2003.

A.I. Comport, E. Marchand, and F. Chaumette, "A real-time tracker for markerless augmented reality," Proc. 2nd IEEE/ACM Int'l Symp. on Mixed and Augmented Reality (ISMAR 2003), pp. 36-45, Oct. 2003.

May 12, 2010 Chinese Official Action in Chinese Patent Appln. No. 200810089948.3 (with English translation).

* cited by examiner

*Primary Examiner* — Mohamed Charioui
*Assistant Examiner* — Toan M Le
(74) *Attorney, Agent, or Firm* — Fitzpatrick, Cella, Harper & Scinto

(57) ABSTRACT

An orientation measurement value acquisition unit (145) acquires an orientation measurement value measured by an orientation sensor (110) mounted on an image capturing apparatus (120), and an orientation measurement value measured by a sensor (115) mounted on a physical object (125). An image processing unit (135) acquires the image coordinates, on a captured image, of indices allocated on the physical object (125). A calibration unit (160) calculates at least one of allocation information of the sensor (110) with respect to the image capturing apparatus (120) and allocation information of the sensor (115) with respect to the physical object (125) using the two orientation measurement values and image coordinates.

6 Claims, 5 Drawing Sheets

INFORMATION PROCESSING APPARATUS AND INFORMATION PROCESSING METHOD

BACKGROUND OF THE INVENTION

1. Field of the Invention

The present invention relates to a calibration technique of orientation sensors mounted on an image capturing apparatus and physical object.

2. Description of the Related Art

Studies about mixed reality that superimposes text and CG pictures on a physical object and that presents a result of superimposing have been extensively made. A presentation apparatus that presents mixed reality can be implemented as an apparatus which superposes and renders, onto a captured image of a physical object captured by an image capturing apparatus such as a video camera or the like, an image generated according to the relationship between the positions and orientations of the image capturing apparatus and physical object. In order to implement such presentation apparatus, the position and orientation of the physical object with respect to the image capturing apparatus need to be measured in real time.

It is a common practice to measure the position and orientation of the physical object with respect to the image capturing apparatus using an image captured by the image capturing apparatus. With this method, features such as markers and the like allocated on the physical object are detected on the captured image, and the position and orientation of the physical object are calculated based on the detected features.

A method which mounts orientation sensors on the image capturing apparatus and physical object, and uses the orientation measurement values by the orientation sensors and the captured image of the image capturing apparatus together has been proposed (see non-patent reference 1). With this method, the position and orientation of the physical object can be measured more stable than a case using the captured image alone.

The method disclosed in non-patent reference 1 is premised on that the orientations of the image capturing apparatus and physical object can be measured by the orientation sensors. However, the orientation measurement value actually output from each orientation sensor represents the orientation of the orientation sensor itself, but it is not the orientation itself of an object to be measured (image capturing apparatus and physical object). That is, the orientation measurement value of the orientation sensor cannot be used intact as the orientation of the object to be measured, and need to undergo some coordinate transformation. More specifically, the coordinate transformation that transforms the orientation of the orientation sensor itself into that of the object to be measured is required. This coordinate transformation can be defined by the orientation of the orientation sensor on a coordinate system with reference to the object to be measured (to be referred to as a measurement target object coordinate system hereinafter). The orientation of the orientation sensor on the measurement target object coordinate system will be referred to as "allocation information" of the orientation sensor hereinafter as needed. This allocation information will also be referred to as the "Local Transform" of the orientation sensor hereinafter. The operation and process for acquiring the allocation information of the orientation sensor will be referred to as "calibration" of the orientation sensor hereinafter.

One conventional calibration method is a trial-and-error method in which the operator interactively increases or decreases parameters that represent the Local Transform.

Patent reference 1 discloses a method of automatically calculating the allocation information of the orientation sensor mounted on the image capturing apparatus using images obtained by capturing markers allocated on a physical space from a plurality of viewpoints. With this method, the orientation sensor mounted on the image capturing apparatus can be calibrated by a very simple operation.

[Non-patent Reference 1] Kotake, Satoh, Uchiyama, and Yamamoto: "Hybrid Registration Using Inclination Constraint", Papers of Meeting on Image Recognition and Understanding (MIRU2006), pp. 241-248, July 2006.

[Non-patent Reference 2] K. Satoh, S. Uchiyama, H. Yamamoto, and H. Tamura: "Robust vision-based registration utilizing bird's-eye view with user's view," Proc. 2nd IEEE/ACM Int'l Symp. on Mixed and Augmented Reality (ISMAR 2003), pp. 46-55, October 2003.

[Non-patent Reference 3] A. I. Comport, E. Marchand, and F. Chaumette, "A real-time tracker for markerless augmented reality," Proc. 2nd IEEE/ACM Int'l Symp. on Mixed and Augmented Reality (ISMAR 2003), pp. 36-45, October 2003.

[Patent Reference 1] Japanese Patent Laid-Open No. 2005-326275

The method disclosed in patent reference 1 cannot calibrate an orientation sensor mounted on an arbitrary physical object other than the image capturing apparatus (in other words, a physical object having no image capturing apparatus). Therefore, in the conventional system, when the orientation sensor is mounted on an arbitrary physical object other than the image capturing apparatus, the operator can adjust the Local Transform of this orientation sensor by only repeating trial and error processes. However, this operation is not easy, and requires advanced skills of the operator.

The method disclosed in patent reference 1 suffers a problem that parameters used as initial values must be estimated and input by an arbitrary method.

Also, the method disclosed in patent reference 1 suffers a problem that the gravity axis direction must be input in advance on a world coordinate system that defines the three-dimensional positions of markers allocated on the physical space.

SUMMARY OF THE INVENTION

It is desirable to solve one or more of the aforementioned problems. It is also desirable to provide a technique for easily and precisely calibrating orientation sensors mounted on an image capturing apparatus and physical object.

According to one aspect of the present invention, an information processing apparatus comprises:

an orientation measurement value acquisition unit adapted to acquire an orientation measurement value measured by an orientation sensor for an image capturing apparatus mounted on the image capturing apparatus, and an orientation measurement value measured by an orientation sensor for a physical object mounted on the physical object to be captured by the image capturing apparatus;

an image acquisition unit adapted to acquire an image of the physical object captured by the image capturing apparatus;

an image coordinate acquisition unit adapted to acquire image coordinates on the image of indices allocated on the physical object; and a calculation unit adapted to calculate at least one of allocation information of the orientation sensor for the image capturing apparatus with respect to the image capturing apparatus, and allocation information of the orientation sensor for the physical object with respect to the physical object using the orientation measurement value measured by the orientation sensor for the image capturing apparatus, the orientation measurement value measured by the orientation sensor for the physical object, and the image coordinates.

According to another aspect of the present invention, an information processing apparatus comprises:

an orientation measurement value acquisition unit adapted to acquire an orientation measurement value measured by an orientation sensor mounted on a physical object;

an image acquisition unit adapted to acquire an image of the physical object captured by the image capturing apparatus;

an image coordinate acquisition unit adapted to acquire image coordinates on the image of indices allocated on the physical object; and a calculation unit adapted to calculate allocation information of the orientation sensor with respect to the physical object using supplied information relating to an orientation of the image capturing apparatus, the orientation measurement value measured by the orientation sensor, and the image coordinates.

According to still another aspect of the present invention, an information processing method comprises:

acquiring an orientation measurement value measured by an orientation sensor for an image capturing apparatus mounted on the image capturing apparatus, and an orientation measurement value measured by an orientation sensor for a physical object mounted on the physical object to be captured by the image capturing apparatus;

acquiring an image of the physical object captured by the image capturing apparatus;

acquiring image coordinates on the image of indices allocated on the physical object; and calculating at least one of allocation information of the orientation sensor for the image capturing apparatus with respect to the image capturing apparatus, and allocation information of the orientation sensor for the physical object with respect to the physical object using the orientation measurement value measured by the orientation sensor for the image capturing apparatus, the orientation measurement value measured by the orientation sensor for the physical object, and the image coordinates.

According to yet another aspect of the present invention, an information processing method comprises:

acquiring an orientation measurement value measured by an orientation sensor mounted on a physical object;

acquiring an image of the physical object captured by the image capturing apparatus;

acquiring image coordinates on the image of indices allocated on the physical object; and calculating allocation information of the orientation sensor with respect to the physical object using supplied information relating to an orientation of the image capturing apparatus, the orientation measurement value measured by the orientation sensor, and the image coordinates.

According to still yet another aspect of the present invention, a computer-readable storage medium storing a computer program for making a computer execute an information processing method comprises:

acquiring an orientation measurement value measured by an orientation sensor for an image capturing apparatus mounted on the image capturing apparatus, and an orientation measurement value measured by an orientation sensor for a physical object mounted on the physical object to be captured by the image capturing apparatus;

acquiring an image of the physical object captured by the image capturing apparatus;

acquiring image coordinates on the image of indices allocated on the physical object; and calculating at least one of allocation information of the orientation sensor for the image capturing apparatus with respect to the image capturing apparatus, and allocation information of the orientation sensor for the physical object with respect to the physical object using the orientation measurement value measured by the orientation sensor for the image capturing apparatus, the orientation measurement value measured by the orientation sensor for the physical object, and the image coordinates.

According to yet still another aspect of the present invention, a computer-readable storage medium storing a computer program for making a computer execute an information processing method comprises:

acquiring an orientation measurement value measured by an orientation sensor mounted on a physical object;

acquiring an image of the physical object captured by the image capturing apparatus;

acquiring image coordinates on the image of indices allocated on the physical object; and calculating allocation information of the orientation sensor with respect to the physical object using supplied information relating to an orientation of the image capturing apparatus, the orientation measurement value measured by the orientation sensor, and the image coordinates.

Further features of the present invention will become apparent from the following description of exemplary embodiments with reference to the attached drawings.

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

An information processing apparatus according to this embodiment calibrates an orientation sensor mounted on an image capturing apparatus such as a video camera or the like (orientation sensor for an image capturing apparatus) and that mounted on a physical object (orientation sensor for a physical object) at the same time. Therefore, the information processing apparatus according to this embodiment will be referred to as a sensor calibration apparatus hereinafter. This sensor calibration apparatus and a sensor calibration method executed by this sensor calibration apparatus will be described below.

Figure 1:
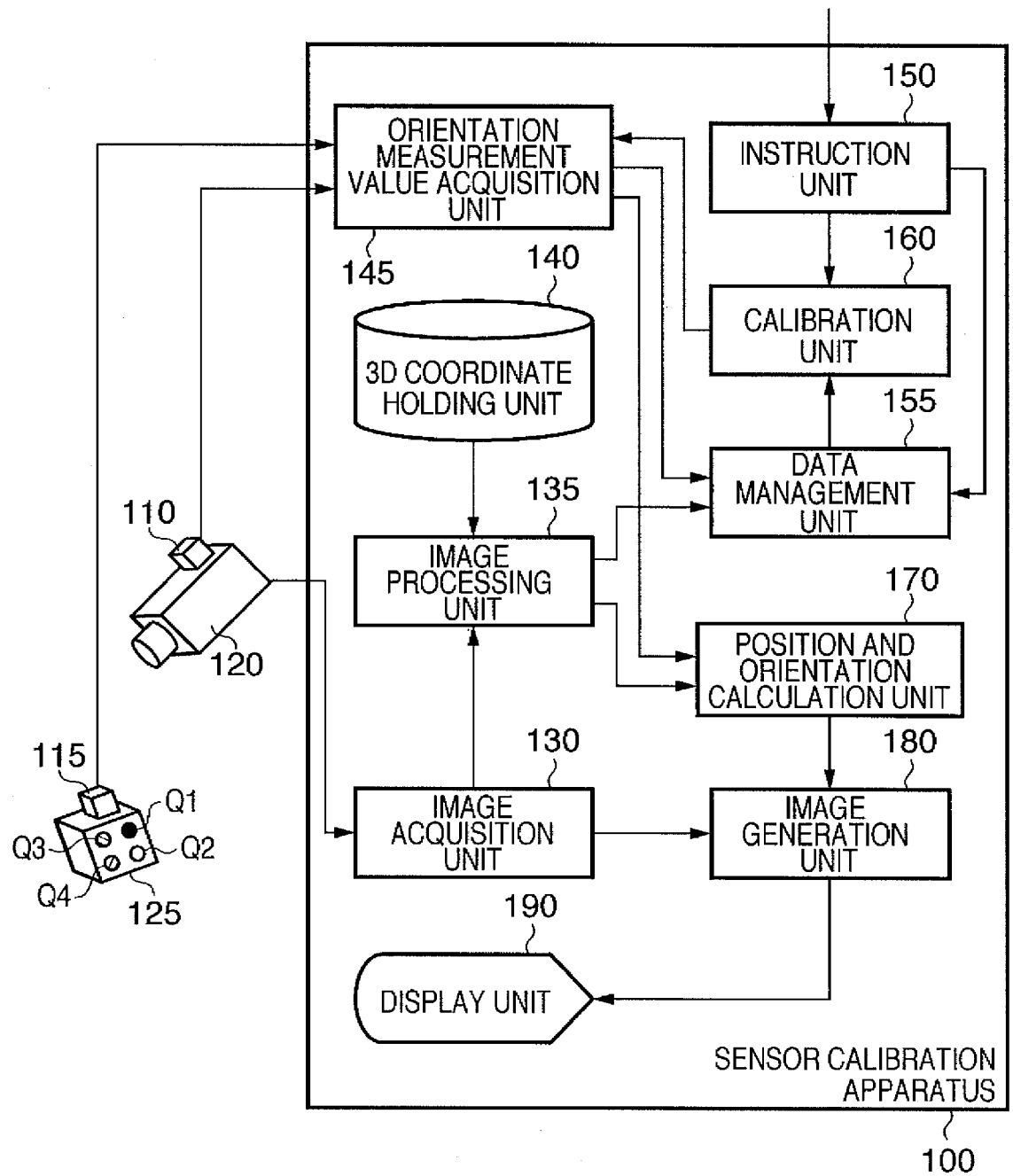
FIG. 1 is a block diagram showing the functional arrangement of a system having a sensor calibration apparatus according to the first embodiment of the present invention.

FIG. 1 is a block diagram showing the functional arrangement of a system having a sensor calibration apparatus according to this embodiment. As shown in FIG. 1, orientation sensors 110 and 115 to be calibrated, and an image capturing apparatus 120 represented by a video camera, which can capture a movie, are connected to a sensor calibration apparatus 100.

The sensor calibration apparatus 100 comprises an image acquisition unit 130, image processing unit 135, three-dimensional (3D) coordinate holding unit 140, orientation measurement value acquisition unit 145, instruction unit 150, data management unit 155, calibration unit 160, position and orientation calculation unit 170, image generation unit 180, and display unit 190.

The orientation sensor 110 is mounted on the image capturing apparatus 120, which is an object whose orientation is to be measured by the orientation sensor 110. The orientation sensor 115 is mounted on a physical object 125, which is an object whose orientation is to be measured by the orientation sensor 115. The object of the sensor calibration apparatus 100 according to this embodiment is to calculate the allocation information of the orientation sensor 110 with respect to the image capturing apparatus 120, and that of the orientation sensor 115 with respect to the physical object 125.

Each of the orientation sensors 110 and 115 measures the orientation of itself on a sensor coordinate system. The orientation sensor is a sensor unit based on, e.g., a gyro sensor and acceleration sensor. More specifically, the orientation sensor comprises TISS-5-40 available from TOKIMEC INC., InertiaCube3 available from InterSense, Inc., U.S.A., and the like. The orientation measurement value measured by these sensors include an accumulation error since it is calculated as a value obtained by temporally integrating an inertia measurement value. However, these orientation sensors have a function of canceling accumulation of errors in an inclination angle direction (pitch angle and roll angle) by observing the gravity direction of the earth by its internal acceleration sensor. For this reason, each orientation sensor has a nature that no accumulation error is generated in the inclination angle direction. In other words, the orientation sensor has an error (azimuth error) accumulated along with an elapse of time in an azimuth angle direction (yaw angle direction). Since the sensor coordinate system of each orientation sensor is set with reference to the gravity axis, the sensor coordinate systems of a plurality of orientation sensors are commonly defined except for an azimuth component as one degree of freedom about the gravity axis.

The orientation measurement value having a degree of freedom of 3 measured by the orientation sensor 110 will be described as a 3×3 rotation matrix $R_{WS\alpha\tau}$. Likewise, the orientation measurement value of a degree of freedom of 3 measured by the orientation sensor 115 will be described as a 3×3 rotation matrix $R_{WSb\tau}$. The orientation measurement values measured by the orientation sensors 110 and 115 are input as data to the orientation measurement value acquisition unit 145.

Upon reception of a request from the data management unit 155, the orientation measurement value acquisition unit 145 outputs data of the orientation measurement values received from the orientation sensors 110 and 115 to the data management unit 155. Upon reception of pieces of allocation information (Local Transforms) of the orientation sensors 110 and 115 calculated by the calibration unit 160 (to be described later) from it, the orientation measurement value acquisition unit 145 holds them. Furthermore, the orientation measurement value acquisition unit 145 converts the orientation measurement values of the orientation sensors 110 and 115 into pieces of information indicating the orientations of the image capturing apparatus 120 and physical object 125 respectively, and outputs the pieces of converted information to the position and orientation calculation unit 170. This conversion is attained by multiplying the orientation measurement values of the orientation sensors 110 and 115 by the corresponding Local Transforms.

Note that the position and orientation of the image capturing apparatus 120 are defined by those of a camera coordinate system set on the image capturing apparatus 120. The camera coordinate system is a coordinate system which has the projection center of an image capturing system of the image capturing apparatus 120 as an origin, and the optical axis direction as a −Z-axis, and the X- and Y-axes are defined as independent axes perpendicular to the Z-axis. The position and orientation of the physical object 125 are defined by those of an object coordinate system set on the physical object 125. The object coordinate system is a coordinate system which defines one point on the physical object 125 as an origin, and three orthogonal axes as X-, Y-, and Z-axes.

The image capturing apparatus 120 captures a movie of a physical space including the physical object 125, and an image of each captured frame (captured image) is input as data to the image acquisition unit 130. Upon reception of the data of the captured image from the image capturing apparatus 120, the image acquisition unit 130 stores it as needed, and then outputs the data to the image processing unit 135 and image generation unit 180.

On the physical object 125, a plurality of indices $Q_k$ (k=1, ..., K) whose positions (object coordinates) on the object coordinate system are given are allocated as those to be captured by the image capturing apparatus 120. Note that k represents the identification number of each index, and K represents the total number of indices. It is desirable to allocate the indices $Q_k$ so that the image capturing apparatus 120 can observe at least four indices at the same time upon acquisition of data for sensor calibration. In the example of FIG. 1, four indices Q1, Q2, Q3, and Q4 are allocated on the same plane of the physical object 125.

The indices $Q_k$ are defined by, e.g., color markers that are small regions having different colors. Alternatively, the indices $Q_k$ are defined by feature points such as natural features or the like having different texture features. The indices that can be used in this embodiment may have arbitrary forms as long as the image coordinates of their projected images on a captured image are detectable, and these indices are identifiable from each other. The indices may be intentionally (artificially) set. However, the indices may also be features such as the corners, patterns, and the like of the physical object, which originally exist on the physical object. A polygonal marker defined by a single-color polygonal region having a certain area may be used. In this case, the vertices of the polygon are used as indices.

The 3D coordinate holding unit 140 holds sets of the identification numbers and object coordinates of the respective indices (indices Q1 to Q4 in case of FIG. 1) allocated on the physical space. That is, in case of FIG. 1, the 3D coordinate holding unit 140 holds, as data, a set of the identification number and object coordinate of the index Q1, a set of the identification number and object coordinate of the index Q2, a set of the identification number and object coordinate of the index Q3, and a set of the identification number and object coordinate of the index Q4. Upon reception of the identification number from the image processing unit 135, the 3D coordinate holding unit 140 returns, to the image processing unit 135, the object coordinate held as a set together with the received identification number. In the following description, the object coordinate of an index Qk with an identification number k will be described as $xO^{Qk}$.

Upon reception of the captured image from the image acquisition unit 130, the image processing unit 135 detects indices included in this captured image, and calculates their image coordinates. Furthermore, the image processing unit 135 identifies the detected indices, and specifies the identification numbers of these indices.

Note that the indices are detected by methods according to the types of indices to be used. For example, when respective indices are defined by color markers having different colors, regions corresponding to respective marker colors are detected from the captured image. Then, their barycentric positions are used as detected coordinates of the indices. When the indices are defined by feature points having different texture features, the positions of the indices are detected by template matching using template images. In this case, the template images of the respective indices are held in advance as given information. When rectangular markers are used, the captured image undergoes binarization processing and labeling processing to detect label regions each defined by four straight lines as marker candidates. Furthermore, it is checked if the rectangular regions of the respective marker candidates include specific patterns, thereby eliminating detection errors. Also, the identification numbers of the rectangular markers are acquired based on the patterns in the rectangular regions. Finally, the coordinates of the four vertices of each rectangular region are output as the positions of four indices.

In this way, since the technique for extracting the identification numbers and image coordinates of indices in the captured image is a well-known technique for those who are skilled in the art, a detailed description about the processing for acquiring the image coordinates and identification numbers will be omitted.

Upon specifying the identification numbers of the detected indices, the image processing unit 135 outputs the specified identification numbers to the 3D coordinate holding unit 140 in order to obtain the object coordinates of the detected indices. As a result, since the 3D coordinate holding unit 140 returns the object coordinates that form sets with the specified identification numbers, the image processing unit 135 acquires these object coordinates. That is, the image processing unit 135 can acquire the object coordinates of the detected indices from the 3D coordinate holding unit 140 by outputting the identification numbers of the detected indices to the 3D coordinate holding unit 140. In this manner, the image processing unit 135 acquires the identification numbers, image coordinates, and object coordinates of all the indices detected from one captured image.

The image processing unit 135 outputs sets (j=1, ..., Jτ) of image coordinates $u^{Qkj\tau}$ and object coordinates $xO^{Qkj}$ of the detected indices to the position and orientation calculation unit 170. In the following description, each detected set will be referred to as corresponding information, and sets of all the detected indices (sets of the image coordinates and object coordinates) will be collectively described as index information Mτ. Therefore, the index information Mτ includes corresponding information for each index.

Note that symbol τ is an identifier indicating the time (timing) when the image acquisition unit 130 acquires the captured image from the image capturing apparatus 120. Therefore, Mτ indicates the index information obtained from the captured image which was acquired by the image acquisition unit 130 at a time represented by the identifier τ (to be simply referred to as time τ hereinafter). Assume that this time τ is measured by a timer (not shown), and the respective units which form the sensor calibration apparatus 100 can acquire the time measured by this timer as needed. Of course, arbitrary data other than the time may be used as long as they can represent the timing.

Symbol j represents a serial number assigned to each index included in one captured image. This symbol j is used for the sake of descriptive convenience. Symbol Jτ represents the total number of indices detected by the image processing unit 135 from the captured image which was acquired by the image acquisition unit 130 at the time τ. Also, symbol kj represents the identification number of the j-th index.

The image processing unit 135 further calculates an estimated value $t'_{CO\tau}$ of the position and an estimated value $R'_{CO\tau}$ of the orientation of the physical object 125 with respect to the image capturing apparatus 120 using the index information MT. Note that $t'_{CO\tau}$ represents a 3D vector that expresses a position. Also, $R'_{CO\tau}$ represents a 3×3 matrix that expresses an orientation.

Note that the method of calculating the position and orientation of a physical object based on the correspondence between the 3D coordinates and image coordinates of a plurality of points on the physical object is prevalently known in the fields of photogrammetry and computer vision, and a detailed description thereof will not be given. Note that the calculations of the position and orientation of the physical object 125 with respect to the image capturing apparatus 120 do not use the orientation measurement values of the orientation sensors 110 and 115 unlike the processing in the position and orientation calculation unit 170 (to be described later).

Upon reception of a request from the data management unit 155, the image processing unit 135 outputs the index information Mτ, and the estimated value $t'_{CO\tau}$ of the position and the estimated value $R'_{CO\tau}$ of the orientation of the physical object 125 to the data management unit 155.

When the operator inputs a "data acquisition" command, the instruction unit 150 sends a "data acquisition" instruction to the data management unit 155. When the operator inputs an "allocation information calculation" command, the instruction unit 150 sends an "allocation information calculation" instruction to the calibration unit 160. The operator inputs these commands to the instruction unit 150 by, e.g., pressing keys assigned with specific commands using a keyboard. However, the command input method is not particularly limited. For example, the operator may input commands using a GUI displayed on a display.

Upon reception of the "data acquisition" instruction from the instruction unit 150, the data management unit 155 acquires an information group which was acquired by the image processing unit 135 based on the captured image acquired by the image acquisition unit 130 at a time (time τ) closest to the instruction reception time. That is, the data management unit 155 acquires the index information Mτ, and the estimated value $t'_{CO\tau}$ of the position and the estimated value $R'_{CO\tau}$ of the orientation of the physical object 125 from the image processing unit 135. Upon reception of the "data acquisition" instruction from the instruction unit 150, the data management unit 155 acquires data of the orientation measurement values measured by the orientation sensors 110 and 115 at the time τ.

The data management unit 155 additionally registers pieces of information acquired in this way in a data list managed by itself as sets.

the orientation measurement value $R_{WSa\tau}$ of the orientation sensor 110 acquired by the orientation measurement value acquisition unit 145 at the time $\tau$ the orientation measurement value $R_{WSb\tau}$ of the orientation sensor 115 acquired by the orientation measurement value acquisition unit 145 at the time X the estimated value $t'_{CO\tau}$ of the position and the estimated value $R'_{CO\tau}$ of the orientation of the physical object 125 calculated based on the captured image acquired by the image acquisition unit 130 at the time $\tau$ the index information $M\tau$ calculated based on the captured image acquired by the image acquisition unit 130 at the time $\tau$ the set of the image coordinate $u^{Qk1\tau}$ and object coordinate $xO^{Qk1}$ of the first index the set of the image coordinate $u^{Qk2\tau}$ and object coordinate $xO^{Qk2}$ of the second index

. . .

Upon reception of a request from the calibration unit 160, the data management unit 155 outputs this data list to the calibration unit 160.

Upon reception of the "allocation information calculation" instruction from the instruction unit 150, the calibration unit 160 issues an acquisition request of the data list to the data management unit 155. The calibration unit 160 then acquires the data list output from the data management unit 155 in response to this acquisition request. The calibration unit 160 executes numeric calculation processes (to be described later) using the acquired data list, thereby calculating the allocation information (i.e., Local Transform) of the orientation sensor 110 and that of the orientation sensor 115. The pieces of calculated allocation information are output to the orientation measurement value acquisition unit 145 as data, are held in that unit 145, and are externally output as needed.

The components for calibrating the orientation sensor 110 allocated on the image capturing apparatus 120 and the orientation sensor 115 allocated on the physical object 125 at the same time have been described. The components to be described below are used to present mixed reality in order to confirm the result obtained by the aforementioned arrangement.

The position and orientation calculation unit 170 calculates the position and orientation of the physical object 125 with respect to the image capturing apparatus 120 by the method described in non-patent reference 1.

That is, the image processing unit 135 acquires the index information MT based on the captured image every time the captured image of one frame is input from the image capturing apparatus 120, and outputs the acquired index information $M\tau$ to the position and orientation calculation unit 170, as described above. Therefore, the position and orientation calculation unit 170 receives this index information $M\tau$.

The position and orientation calculation unit 170 acquires the values, which were acquired as the orientations of the image capturing apparatus 120 and physical object 125 by the orientation measurement value acquisition unit 145 at a time closest to the time $\tau$ (which may be approximately considered as the time $\tau$).

Note that the "orientation of the image capturing apparatus 120 at a time closest to the time $\tau$" is calculated as follows. That is, this orientation is calculated so that the orientation measurement value of the orientation sensor 110 acquired by the orientation measurement value acquisition unit 145 at a time closest to the time $\tau$ using the allocation information of the orientation sensor 110 held by the orientation measurement value acquisition unit 145 at that time, as described above. Also, the "orientation of the physical object 125 at a time closest to the time $\tau$" is calculated as follows. That is, this orientation is calculated based on the orientation measurement value of the orientation sensor 115 acquired by the orientation measurement value acquisition unit 145 at a time closest to the time $\tau$ using the allocation information of the orientation sensor 115 held by the orientation measurement value acquisition unit 145 at that time, as described above.

The position and orientation calculation unit 170 then calculates the position and orientation of the physical object 125 with respect to the image capturing apparatus 120 based on the index information $M\tau$, the orientation of the image capturing apparatus 120, and that of the physical object 125 using the technique disclosed in non-patent reference 1. Since the calculations in this case are made based on the assumption that the given Local Transforms are accurate, the calculated position and orientation reflect the accuracy of the Local Transforms.

The image generation unit 180 acquires the captured image from the image acquisition unit 130. The image generation unit 180 also acquires the position and orientation of the physical object 125 with respect to the image capturing apparatus 120 from the position and orientation calculation unit 170, and generates an image (superimposed image) that presents mixed reality by superimposing an image of a virtual object rendered based on the acquired position and orientation on the captured image. The image generation unit 180 then outputs the generated image to the display unit 190.

The display unit 190 acquires the image that presents the mixed reality from the image generation unit 180, and displays it to present the mixed reality to the operator. The operator visually observes the displayed image, and can judge the accuracy of the calibration result based on that of registration between the physical space and virtual space in the presented mixed reality. Note that the display unit 190 may be integrated with the image capturing apparatus 120. In this case, the image capturing apparatus 120 and display unit 190 form a so-called Head Mounted Display (HMD).

Figure 3:
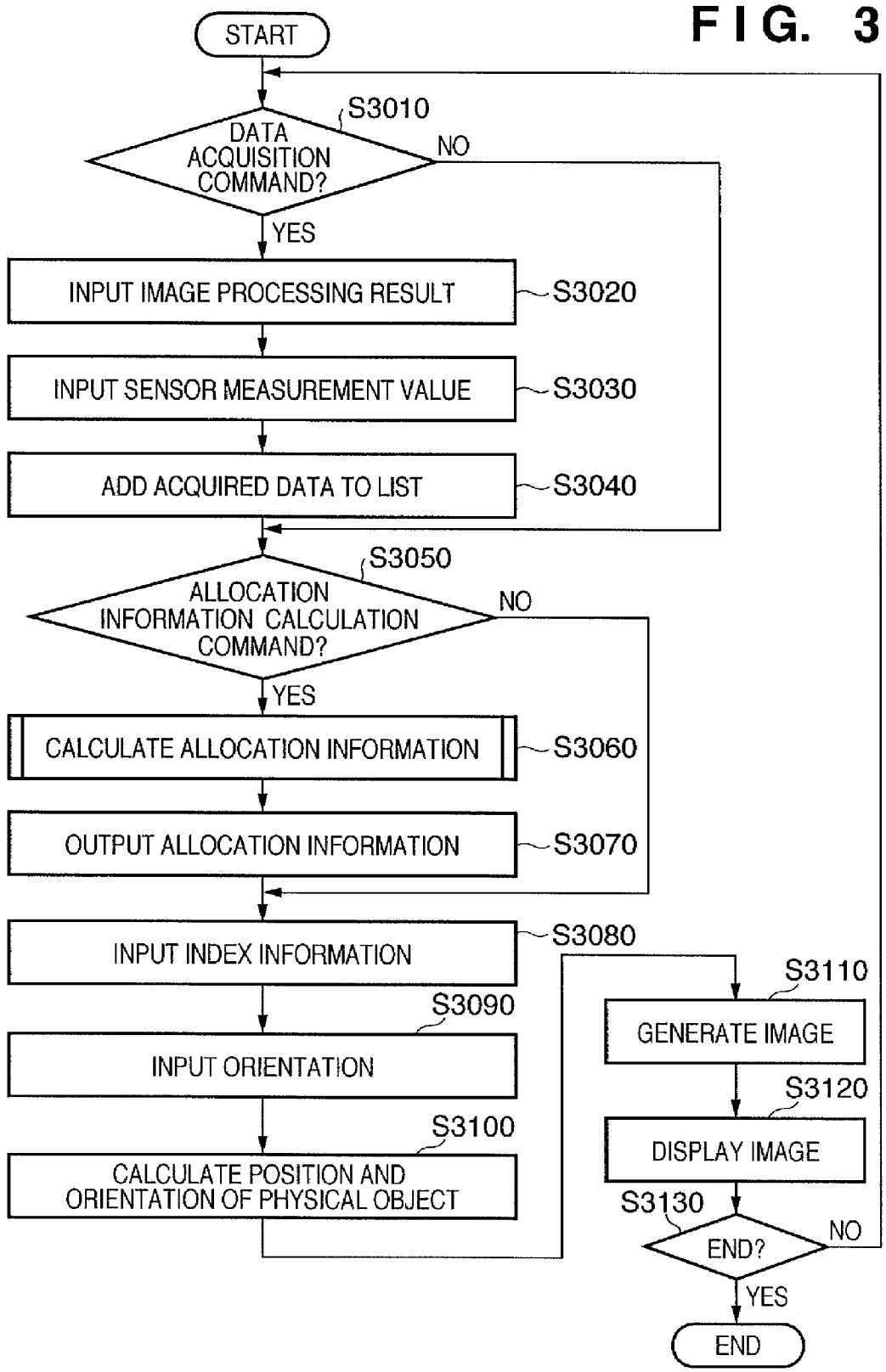
FIG. 3 is a flowchart of main processing to be executed by the sensor calibration apparatus 100.

The main processing to be executed by the sensor calibration apparatus 100 will be described below with reference to FIG. 3 which shows a flowchart of that processing. Upon execution of the processing according to the flowchart shown in FIG. 3, the operator inputs a "data acquisition" command several times while variously changing the orientations of the image capturing apparatus 120 and physical object 125. After that, the operator inputs an "allocation information-calculation" command. In the following description, symbol $\tau$ is used as an input time of the "data acquisition" command. At different times $\tau$, the image capturing apparatus 120 and physical object 125 respectively have different orientations.

The instruction unit 150 checks in step S3010 if the operator has input a "data acquisition" command. If the operator has input a "data acquisition" command, the instruction unit 150 sends a "data acquisition" instruction to the data management unit 155, and the process advances to step S3020. On the other hand, if the operator has not input any "data acquisition" command yet, the process jumps to step S3050.

In step S3020, the data management unit 155 acquires, from the image processing unit 135, an image processing result which is acquired by the image processing unit 135 based on the captured image acquired by the image acquisition unit 130 at a time $\tau$. That is, this image processing result includes the index information MT, and the estimated value $t'_{CO\tau}$ of the position and the estimated value $R'_{CO\tau}$ of the orientation of the physical object 125, as described above.

In step S3030, the data management unit 155 acquires the orientation measurement values $R_{WSa\tau}$ and $R_{WSb\tau}$ measured by the orientation sensors 110 and 115 at the time τ from the orientation measurement value acquisition unit 145.

In step S3040, the data management unit 155 additionally registers a set [$R_{WSa\tau}$, $R_{WSb\tau}$, $t'_{CO\tau}$, $R'_{CO\tau}$, $M\tau$] obtained by combining information groups acquired in steps S3020 and S3030 to a data list L.

With the processes in steps S3010 to S3040 described above, the set acquired in response to the single "data acquisition" instruction is registered in the data list L. By repeating the processes in steps S3010 to S3040 a plurality of times, a plurality of sets can be registered in the data list L. At this time, the time τ (τ=1, . . . , T) can be construed as an identifier of each set registered in the data list L. Note that T represents the number of different sets (different times and different orientations) included in the data list L.

The instruction unit 150 checks in step S3050 if the operator has input an "allocation information calculation" command. If the operator has input the "allocation information calculation" command, the instruction unit 150 sends an "allocation information calculation" instruction to the calibration unit 160, and the process advances to step S3060. On the other hand, if the operator has not input any "allocation information calculation" command yet, the process jumps to step S3080.

In step S3060, the calibration unit 160 acquires the data list L from the data management unit 155, and executes processing for calculating respective pieces of allocation information of the orientation sensors 110 and 115 using the acquired data list L. Details of this processing will be described later with reference to the flowchart of FIG. 4.

In step S3070, the calibration unit 160 outputs the respective pieces of allocation information of the orientation sensors 110 and 115 calculated in step S3060 to the orientation measurement value acquisition unit 145. Also, the unit 160 outputs these pieces of allocation information to a device outside the sensor calibration apparatus 100 as needed.

In step S3080, the position and orientation calculation unit 170 acquires, from the image processing unit 135, the index information Mτ, which was acquired by the image processing unit 135 based on the captured image acquired by the image acquisition unit 130 at the time τ.

In step S3090, the position and orientation calculation unit 170 acquires the values, which were calculated by the orientation measurement value acquisition unit 145 as the orientations of the image capturing apparatus 120 and physical object 125 at the time τ. These acquired orientations represent those by executing the coordinate transformation of the orientation measurement value based on the Local Transforms of the orientation sensors held by the orientation measurement value acquisition unit 145. Therefore, if the allocation information calculation processing in step S3060 is accurately done, the orientations obtained in this step accurately represent the orientations of the image capturing apparatus 120 and physical object 125 (which inevitably include measurement errors of the sensors).

In step S3100, the position and orientation calculation unit 170 calculates the position and orientation of the physical object 125 with respect to the image capturing apparatus 120 based on the index information Mτ acquired in step S3080 and the orientations of the image capturing apparatus 120 and physical object 125 acquired in step S3090. Since this calculation processing can be achieved by a known method disclosed in, e.g., non-patent reference 1, a detailed description thereof will be omitted. The position and orientation calculation unit 170 outputs data of the calculated position and orientation to the image generation unit 180. Also, the unit 170 externally outputs data of the calculated position and orientation as needed.

In step S3110, the image generation unit 180 generates an image that presents mixed reality, and outputs the generated image to the display unit 190. The image that presents mixed reality is generated by the following processing. The image generation unit 180 acquires the position and orientation of the physical object 125 with respect to the image capturing apparatus 120 from the position and orientation calculation unit 170. Furthermore, the unit 180 acquires the captured image acquired by the image acquisition unit 130 at the time τ from the image acquisition unit 130. The unit 180 then superimposes, on this captured image, an image of a virtual object rendered based on the position and orientation of the physical object 125 with respect to the image capturing apparatus 120. As the virtual object, for example, arrows that represent the three axes of the object coordinate system may be displayed as information which does not depend on the type of the physical object 125. Alternatively, an X=0 plane, Y=0 plane, Z=0 plane, and the like may be displayed using wire frames. Or a wire frame model of the physical object 125 may be held in advance, and may be superimposed on the physical object 125. Arbitrary virtual objects may be displayed as long as they have contents that allow the operator to confirm if the position and orientation of the physical object 125 are accurately calculated.

In step S3120, the display unit 190 acquires the image that presents the mixed reality from the image generation unit 180, and displays it to present mixed reality to the operator.

Finally, the instruction unit 150 checks in step S3130 if the processing is to end. If the operator has input an end instruction of this processing via the instruction unit 150, this processing ends. If the operator has not input any end instruction yet, the process returns to step S3010.

Figure 4:
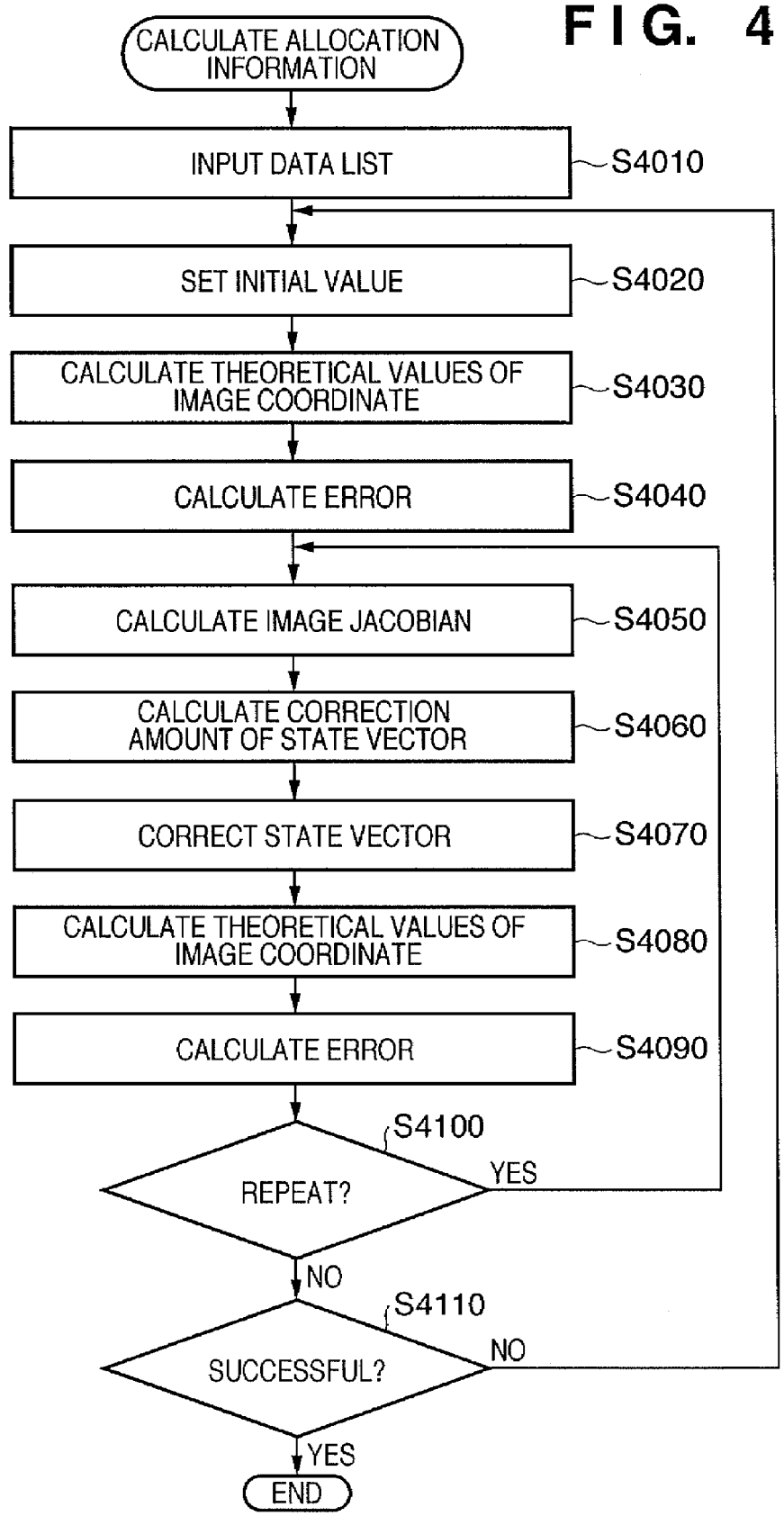
FIG. 4 is a flowchart showing details of the process in step S3060.

Details of the allocation information calculation processing in step S3060 will be described below with reference to the flowchart shown in FIG. 4. FIG. 4 is a flowchart showing details of the processing in step S3060.

The calibration unit 160 handles the allocation information, to be calculated, of the orientation sensor, i.e., the Local Transform, as a three-valued vector $\omega=[\xi\ \psi\ \zeta]^T$. Various methods of expressing the orientation using three values are available. In this embodiment, assume that the orientation is expressed by a three-valued vector in which the magnitude of the vector defines the rotation angle, and the direction of the vector defines the rotation axis direction. In the following description, each Local Transform is described using a 3×3 rotation matrix $R(\omega)$, as needed. Transformation between the rotation matrix and three-valued vector can be easily attained using a known transformation formula. In the following description, the allocation information of the orientation sensor 110 is described as $\omega_{SC}=[\xi_{SC}\ \psi_{SC}\ \zeta_{SC}]^T$ (unknown), and that of the orientation sensor 115 is described as $\omega_{SO}=[\xi_{SO}\psi_{SO}\zeta_{SO}]^T$ (unknown).

The calibration unit 160 estimates positions $t_{CO\tau}=[x_{CO\tau}\ y_{CO\tau}\ z_{CO\tau}]^T$ (unknown), of the physical object 125, at respective times τ registered in the data list L in the process for calculating the Local Transforms. Also, the unit 160 estimates correction values φτ (unknown) of relative azimuth errors at respective times τ. The relative azimuth error represents a relative value between an azimuth error included in the orientation measurement value of the orientation sensor 110, and an azimuth error included in the orientation measurement value of the orientation sensor 115. Note that the relative azimuth error also includes a difference between the azimuth components of the sensor coordinate systems of the respective orientation sensors.

In the following description, these unknown parameters to be calculated are described using a (6+4T)-dimensional state vector $s=[\omega_{SC}\ \omega_{SO}\ t_{CO1}\ \phi_1\ \ldots\ t_{CO\tau}\ \phi_\tau\ \ldots\ t_{COT}\ \phi_T]$. In the following calculations, the value of the state vector s is optimized by iterative calculations using the pieces of information of indices and the orientation measurement values at a plurality of times held in the data list L. More specifically, the value of s is updated so as to minimize errors between actually measured values of the image coordinates of each detected index and theoretical values of the image coordinates of each index which assume a certain state vector s as a whole.

In step S4010, the calibration unit 160 acquires the data list L from the data management unit 155.

In step S4020, the calibration unit 160 gives appropriate initial values to the state vector s. The unit 160 sets a position estimated value $t'_{CO\tau}$ of the physical object 125 at a corresponding time $\tau$ in the data list L as an initial value of $t_{CO\tau}$ at each $\tau$. The unit 160 sets, as an initial value common to all "$\phi_\tau$"s, a value which is not selected yet from those obtained by equally dividing the perimeter direction. For example, upon dividing the perimeter direction into six equal parts, the unit 160 sets one of 0°, 60°, 120°, 180°, 240°, and 300°. The unit 160 sets, as an initial value of $\omega_{SC}$, an orientation which is not selected as a combination with the initial value of $\phi_\tau$ from some candidates prepared in advance. Furthermore, the unit 160 sets, as an initial value of $\psi_{SO}$, an orientation calculated using the initial values of $\phi_\tau$ and $\omega_{SC}$ set above by:

$$R(\omega_{SO}) = (R_{WSa\tau}^{-1} \cdot \Delta R(\phi_\tau) \cdot R_{WSb\tau})^{-1} \cdot R(\omega^{SC}) \cdot R'_{CO\tau} \quad (1)$$

where $R_{WSa\tau}$, $R_{WSb\tau}$, and $R'_{CO\tau}$ respectively represent the values obtained from an arbitrary one set (at a certain time $\tau$) selected from the data list L. Also, $\Delta R(\phi_\tau)$ represents a 3×3 rotation matrix which adds a rotation (correction of the relative azimuth error) in an azimuth angle direction by $\phi_\tau$, and is defined by:

$$\Delta R(\phi) = \begin{bmatrix} \cos\phi & 0 & \sin\phi \\ 0 & 1 & 0 \\ -\sin\phi & 0 & \cos\phi \end{bmatrix} \quad (2)$$

On the other hand, $R(\omega)$ is a rotation matrix determined by $\omega$, and is defined by:

$$R(\omega) = \begin{bmatrix} \frac{\xi^2}{\theta^2}(1-\cos\theta)+\cos\theta & \frac{\xi\psi}{\theta^2}(1-\cos\theta)-\frac{\zeta}{\theta}\sin\theta & \frac{\xi\zeta}{\theta^2}(1-\cos\theta)+\frac{\psi}{\theta}\sin\theta \\ \frac{\psi\xi}{\theta^2}(1-\cos\theta)+\frac{\zeta}{\theta}\sin\theta & \frac{\psi^2}{\theta^2}(1-\cos\theta)+\cos\theta & \frac{\psi\zeta}{\theta^2}(1-\cos\theta)-\frac{\xi}{\theta}\sin\theta \\ \frac{\zeta\xi}{\theta^2}(1-\cos\theta)-\frac{\psi}{\theta}\sin\theta & \frac{\zeta\psi}{\theta^2}(1-\cos\theta)+\frac{\xi}{\theta}\sin\theta & \frac{\zeta^2}{\theta^2}(1-\cos\theta)+\cos\theta \end{bmatrix} \quad (3)$$

where $\theta$ is defined by:

$$\theta = \sqrt{\xi^2 + \psi^2 + \zeta^2} \quad (4)$$

In step S4030, the calibration unit 160 calculates theoretical values of the image coordinates of the indices in association with respective pieces of corresponding information registered in the data list L. The theoretical value of the image coordinate of an index indicates coordinate where this index is to be observed in the captured image when hypotheses are given to the position and orientation of the physical object 125 with respect to the image capturing apparatus 120. In the following description, the theoretical value of the image coordinate associated with a set of the object coordinate $xO_i$ and image coordinate (actually measured value) $u_i$ of an index is described as $u_i'$. Note that symbol i (i=1, ..., I) is a serial number assigned to each corresponding information of the indices in the data list L, and I represents the total number of pieces of corresponding information of the indices. That is, we have $I=\Sigma_\tau J_\tau$.

The theoretical value $u_i'$ is calculated based on an observation equation $F_{\tau i}(\ )$ having the state vector s as a variable by:

$$u_i' = F_{\tau i}(s, x_{Oi}) \quad (5)$$

where $\tau_i$ represents the time of a set to which the i-th corresponding information belongs. The observation equation $F_{\tau i}(\ )$ includes transformation from the object coordinate $xO_i$ into camera coordinate $x_{Ci}$, and that from the camera coordinate $x_{Ci}$ into the image coordinate $u_i'$. The former is model view transformation, and is defined using $\omega_{SC}$, $\omega_{SO}$, $t_{CO\tau i}$, and $\phi_{\tau i}$ as elements of the state vector s by:

$$x_{Ci} = [x_{Ci}\ y_{Ci}\ z_{Ci}]^T \quad (6)$$
$$= R_{CO\tau i} \cdot x_{Oi} + t_{CO\tau i}$$
$$= (R_{WSa\tau i} \cdot R(\omega_{SC}))^{-1} \cdot \Delta R(\phi_{\tau i}) \cdot R_{WSb\tau i} \cdot R(\omega_{SO}) \cdot x_{Oi} + t_{CO\tau i}$$

On the other hand, the latter is perspective transformation, and is defined by:

$$u_i' = \left[ -f_x \frac{x_{Ci}}{z_{Ci}}\ -f_y \frac{y_{Ci}}{z_{Ci}} \right]^T \quad (7)$$

where $f_x$ and $f_y$ are the focal lengths of the image capturing apparatus 120 in the x- and y-axis directions respectively, and are held in advance as given values in the calibration unit 160.

In step S4040, the calibration unit 160 calculates errors $\Delta u_i$ between the image coordinates $u_i$ obtained as actually measured values and the theoretical values $u_i'$ of the corresponding image coordinates for respective pieces of corresponding information of the indices (i.e., for all "i"s) by:

$$\Delta u_i = u_i - u_i' \quad (8)$$

In step S4050, the calibration unit 160 calculates image Jacobians $J_i$ ($=\partial u_i / \partial s$) associated with the state vector s for all "i"s. The image Jacobian is a matrix (Jacobian matrix) of 2 rows×(6+4T) columns having, as elements, solutions obtained by partially differentiating the observation equation $F_{\tau i}(\ )$ given by equation (5) with respect to respective elements of the state vector s. More specifically, the unit 160 calculates, first, a Jacobian matrix $J_{u\_xCi}$ ($=\partial u_i/\partial x_{Ci}$) of 2 rows×3 columns having, as elements, the solutions obtained by partially differentiating the right-hand side of equation (7) with respect to respective elements of the position vector $x_{Ci}$ on the camera coordinate system. The unit 160 then calculates a Jacobian matrix $J_{xCi\_s}$ ($=\partial x_{Ci}/\partial s$) of 3 rows×(6+4T) columns having, as elements, the solutions obtained by partially differentiating the right-hand side of equation (6) with respect to respective elements of the state vector s. After that, the unit 160 calculates each image Jacobian $J_i$ by:

$$J_i = J_{u\_xCi} \cdot J_{xCi\_s} \qquad (9)$$

Since the derivation method of the Jacobian matrix $J_{u\_xCi}$ is known, a description thereof will be omitted. For example, the derivation method is disclosed in non-patent reference 2 and the like. On the other hand, $J_{xCi\_s}$ calculated as follows. In order to explain the following calculations, equation (6) that expresses the model view transformation is decomposed into the following four equations:

$$x_{Ci} = R_{WCi}^{-1} \cdot x_{Wi} \qquad (10)$$

$$R_{WCi} = R_{WSai} \cdot R(\omega_{SC}) \qquad (11)$$

$$x_{Wi} = R_{WOi} \cdot x_{Oi} + R_{WCi} \cdot t_{COi} \qquad (12)$$

$$R_{WOi} = \Delta R(\phi_{ti}) \cdot R_{WSbi} \cdot R(\omega_{SO}) \qquad (13)$$

According to these equations, $J_{xCi\_s}$ can be decomposed into two matrices associated with $\omega_{SC}$ and other elements (to be equated to s') as follows:

$$J_{xCi\_s} = [J_{xCi\_\omega SC} J_{xCi\_xWi} J_{xWi\_s'}] \qquad (14)$$

where $J_{xCi\_\omega SC}$ is a partial derivative of equation (10) with respect to $\omega_{SC}$, and can be derived from equations (10) and (11) by:

$$J_{xCi\_\omega SC} = J_{xCi\_rWCi} \cdot J_{rWCi\_rSC} \cdot J_{rSC\_\omega SC} \qquad (15)$$

where $J_{xCi\_rWCi}$ is a partial derivative of equation (10) with respect to respective elements of $R_{WCi}$. $J_{rWCi\_rSC}$ is a partial derivative of equation (11) with respect to respective elements of $R(\omega_{SC})$. $J_{rSC\_\omega SC}$ is a partial derivative of $R(\omega_{SC})$ with respect to $\omega_{SC}$. $J_{xCi\_xWi}$ is a partial derivative of equation (10) with respect to $X_{Wi}$. $J_{xWi\_s'}$ is a partial derivative of equation (12) with respect to s', and can be calculated by decomposing it into respective elements of s' by:

$$J_{xWi\_s'} = [J_{xWi\_\omega SO} J_{xWi\_t1} J_{xWi\_\phi 1} \ldots J_{xWi\_tT} J_{xWi\_\phi T}] \qquad (16)$$

where $J_{xWi\_\omega SO}$ is a partial derivative of equation (12) with respect to $\omega_{SO}$, and can be derived from equations (12) and (13) by:

$$J_{xWi\_\omega SO} = J_{xWi\_rWOi} \cdot J_{rWOi\_rSO} \cdot J_{rSO\_\omega SO} \qquad (17)$$

where $J_{xWi\_rWOi}$ is a partial derivative of equation (12) with respect to respective elements of $R_{WOi}$. $J_{rWOi\_rSO}$ is a partial derivative of equation (13) with respect to respective elements of $R(\omega_{SO})$. $J_{rSO\_\omega SO}$ is a partial derivative of $R(\omega_{SO})$ with respect to $\omega_{SO}$. $J_{xWi\_t\tau}$ is a partial derivative of equation (12) with respect to $t_{CO\tau i}$, and can be derived from equation (12) by:

$$J_{xWi\_t\tau} = R_{WCi} \text{ (when } \tau = \tau_i) \qquad (18)$$

$$J_{xWi\_t\tau} = 0 \text{ (when } \tau \neq \tau_i) \qquad (19)$$

On the other hand, $J_{xWi\_\phi\tau}$ is a partial derivative of equation (12) with respect to $\phi_{\tau i}$, and can be derived from equations (12) and (13) by:

$$J_{xWi\_\phi\tau} = J_{xWi\_rWOi} \cdot J_{rWOi\_\Delta r\tau} \cdot J_{\Delta r\tau\_\phi\tau} \text{ (when } \tau = \tau_i) \qquad (20)$$

$$J_{xWi\_\phi\tau} = 0 \text{ (when } \tau \neq \tau_i) \qquad (21)$$

where $J_{rWOi\_\Delta r\tau}$ is a partial derivative of equation (13) with respect to respective elements of $R(\phi_{\tau i})$. $J_{\Delta r\tau\_\phi\tau}$ is a partial derivative of $R(\phi_{\tau i})$ with respect to $\phi_{\tau i}$.

By calculating these Jacobian matrices in turn, $J_{xCi\_s}$ can be calculated. Since the rest of the calculation can be done by general partial differentiation, a description thereof will be omitted.

In step S4060, the calibration unit 160 calculates a correction value Δs of s based on the errors $\Delta u_i$ and Jacobian matrixes $J_i$ for all "i"s calculated in the above steps. More specifically, the unit 160 generates an error vector U by vertically arranging the errors $\Delta u_i$ for all "i"s and a matrix Φ by vertically arranging the Jacobian matrices $J_i$ for all "i"s, and calculates Δs by:

$$\Delta s = \Phi^+ U \qquad (22)$$

where $\Phi^+$ is a pseudo inverse matrix of Φ, and can be calculated by, for example, $\Phi^+ = (\Phi^T \Phi)^{-1} \Phi^T$. $\Phi^+$ may be derived by any other methods.

Note that the calculation of the correction value by the processing in step S4060 described above corresponds to application of a Gauss-Newton method as one nonlinear optimization method. The correction value calculation method using the error vector U and Jacobian matrix Φ has been proposed in addition to the Gauss-Newton method, and may use, for example, a Levenberg-Marquardt method, steepest descent method, and the like. A robust estimation method such as M-estimation that excludes outliers or the like may be combined, and any other solving methods may be used.

In step S4070, the calibration unit 160 corrects the state vector s using the correction value Δs calculated in step S4060 by:

$$s + \Delta s \to s \qquad (23)$$

and sets the calculated value as new s.

In step S4080, the calibration unit 160 calculates the theoretical values of the image coordinates for the respective pieces of corresponding information of the indices using the updated state vector s by the same processing as in step S4030.

In step S4090, the calibration unit 160 calculates the errors $\Delta u_i$ between the actually measured values and theoretical values of the image coordinates for the respective pieces of corresponding information of the indices using the updated state vector s by the same processing as in step S4040.

The calibration unit 160 determines in step S4100 using some criteria whether or not to continue the iterative processing. If the calibration unit 160 determines that no more iterative processing is required, the process advances to step S4110. On the other hand, if the calibration unit 160 determines that the iterative processing to be continued, it executes the processes from steps S4050 to S4090 using the updated s again.

Whether or not to continue the iterative processing is determined by checking that, for example, the calculations converge or diverge. If it is determined that the calculations neither converge nor diverge, the iterative processing is continued. On the other hand, if it is determined that the calculations converge or diverge, the iterative processing ends. In place of determination of convergence or divergence, the iterative processing may be always executed a predetermined number of times. Convergence or divergence can be determined by checking the magnitude of the error vector U updated in step S4090. For example, convergence may be determined using criteria as to whether or not the magnitude of the error vector U is smaller than a predetermined threshold or whether or not the change amount of the magnitude of the error vector U is smaller than a predetermined threshold. If both of these parameters are smaller than the thresholds, it is determined that the processing is to end.

Also, divergence may be determined using criteria as to whether or not the magnitude of the error vector U is increasing as a whole or whether or not the magnitude of the error vector U is larger than a predetermined threshold. Also, convergence determination may be made based on the magnitude of the correction value Δs.

Since the iterative calculations are conventionally made a finite number of times using the end conditions of the iterative calculations, no more explanation thereof will be given.

The calibration unit 160 checks in step S4110 whether or not the optimization calculations (steps S4030 to S4100) made for the initial values set in step S4020 have succeeded. More specifically, if the magnitude of the error vector U updated in step S4090 is equal to or smaller than a predetermined threshold, the unit 160 determines that the optimization calculations have succeeded. If the unit 160 determines that the optimization calculations have failed, the process returns to step S4020. The unit 160 re-sets other candidates as the initial values of the state vector, and executes the subsequent optimization calculations (steps S4030 to S4100) again. If the unit 160 determines that the optimization calculations have succeeded, the processing ends.

With the aforementioned processing, the orientation sensors mounted on the image capturing apparatus 120 and physical object 125 can be easily and accurately calibrated. Also, the need for inputting the initial values and the direction of the gravity axis in advance can be obviated.

Second Embodiment

In the first embodiment, the orientation sensor 110 is mounted on the image capturing apparatus 120. However, in consideration of only the object of measuring the allocation information of the orientation sensor 115 mounted on the physical object 125, the orientation sensor 110 need not to always be mounted on the image capturing apparatus 120. This embodiment will explain a system when no orientation sensor is mounted on the image capturing apparatus 120.

Figure 5:
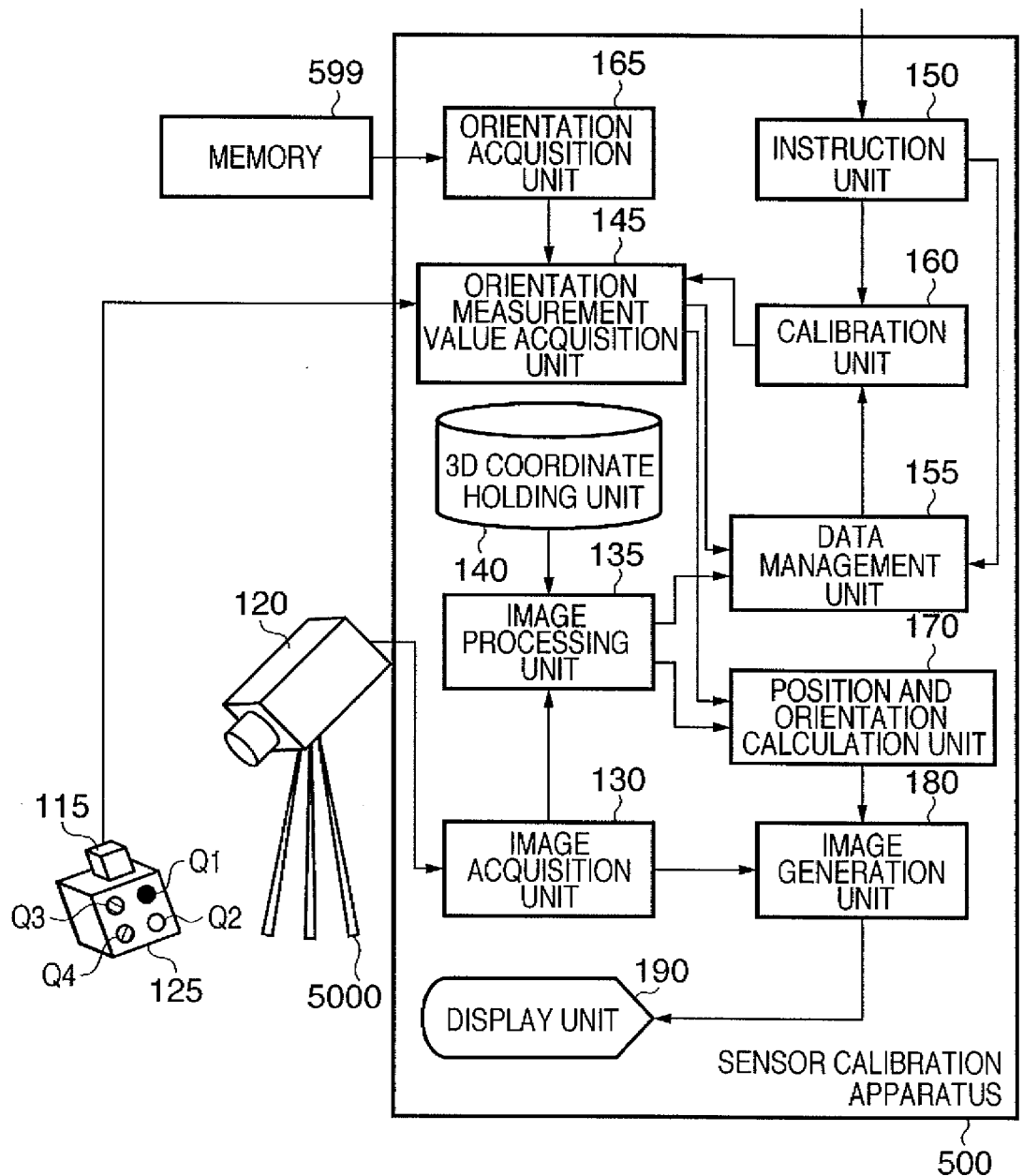
FIG. 5 is a block diagram showing the functional arrangement of a system having a sensor calibration apparatus according to the second embodiment of the present invention.

FIG. 5 is a block diagram showing the functional arrangement of a system having a sensor calibration apparatus according to this embodiment. The same reference numerals in FIG. 5 denote the same components shown in FIG. 1, and a repetitive description thereof will be avoided. The arrangement shown in FIG. 5 is different from that shown in FIG. 1 in the following three points.

No orientation sensor is mounted on the image capturing apparatus 120.

The orientation of the image capturing apparatus 120 is fixed by a tripod 5000.

An orientation acquisition unit 165 is newly added to a sensor calibration apparatus 500.

These three points will be mainly described below. Of course, the arrangement other than the points to be described below is the same as that of the first embodiment.

The image capturing apparatus 120 is set on the tripod 5000. An orientation $R_{WC}$ of the image capturing apparatus 120 is measured in advance, and is held in an external memory 599 as data. In order to measure the orientation $R_{WC}$ of the image capturing apparatus 120, some indices whose 3D positions on the world coordinate system are given are allocated on the physical space, and are captured by the image capturing apparatus 120. Then, the image coordinates of the indices are detected, and the orientation of the image capturing apparatus 120 on the world coordinate system is calculated based on the correspondence between the world coordinates and image coordinates of the indices. Note that an inclination of the camera coordinate system with respect to the gravity axis (an axis indicating a direction opposite to the gravity axis) may be obtained as the orientation $R_{WC}$ of the image capturing apparatus 120. That is, an azimuth on the world coordinate system may agree with an arbitrary direction, and the Y-axis need to agree with the opposite direction of the gravity axis.

The orientation acquisition unit 165 reads out data of the orientation $R_{WC}$ of the image capturing apparatus 120 held in the external memory 599. The following processing is made by replacing the orientation measurement value $R_{WS\tau}$ of the orientation sensor 110 in the first embodiment with the orientation $R_{WC}$. Also, the allocation information $\omega_{SC}$ of the orientation sensor 110, which is to be derived in the first embodiment, may be considered as a given unit matrix.

The subsequent processing is the same as that in the first embodiment. As changes from the first embodiment, components associated with $\omega_{SC}$ are excluded from the state vector s and Jacobian matrix $J_i$. Then, the same processing as the optimization calculations of the first embodiment is executed for this new s. Since $\omega_{SC}$ is given, a combination of the initial values to be set in step S4020 is determined based only on φ. That is, by selecting a certain angle as the initial value of φ4, the initial value of $\omega_{SO}$ is uniquely determined by equation (1).

Note that the image capturing apparatus 120 need not to always be fixed as long as its orientation $R_{WC}$ can be measured by arbitrary means. The orientation of the image capturing apparatus 120 may be kept measured by, e.g., observing indices on the world coordinate system. Alternatively, a sensor such as a magnetic sensor, optical sensor, or the like may be mounted on the image capturing apparatus 120, thereby measuring the position and orientation of the image capturing apparatus 120.

<Modification 1>

In the aforementioned embodiments, the indices each of which represents one coordinate position (to be referred to as point indices hereinafter) are used. However, indices other than point indices may be used. For example, indices configured by line features such as edges (to be referred to as line indices hereinafter) may be used.

An overview of the processing when line indices are used will be described below. Even when line features are used, the mechanism can be applied. The mechanism is to input pieces of information of indices and respective orientation measurement values at a plurality of times, and optimize the state vector using projection errors of the indices as criteria. Upon using the line indices, the image processing unit 135 estimates the position and orientation of the physical object 125 by, for example, a method disclosed in non-patent reference 3.

The calibration unit 160 calculates theoretical values of image coordinates at which some points (to be referred to as division points hereinafter) on the line indices would be observed when the state vector is s. Then, the unit 160 defines, as errors of the division points, distances in a direction normal upto edges (actually measured values) to be actually detected in the vicinity of these image coordinates. Then, the unit 160 forms an error vector U using errors associated with all the division points. On the other hand, the unit 160 partially differentiates the derivation equation of the error defined as a function of the state vector s with respect to respective elements of s, and forms a Jacobian matrix Φ of one row×(6+4T) columns having these solutions as elements.

The calibration unit 160 then executes the same optimization calculations as in the above embodiments using the error vector U and Jacobian matrix Φ obtained in this way, thus calculating the allocation information. Of course, these features may be used in combination by accumulating the errors and image Jacobians obtained from the line indices, point indices, and other indices.

<Modification 2>

In the above embodiments, in the optimization calculations of the calibration unit 160, the position $t_{CO\tau}$ of the physical object 125 at the time τ is unknown. However, the estimated value $t'_{CO\tau}$ of the position of the physical object 125 at each time τ held in the data list L may be equated to $t_{CO\tau}$, and $t_{CO\tau}$ may be handled as a given value in the optimization calculation process. In this case, as changes from the above embodiments, components associated with $t_{CO\tau}$ may be excluded from the state vector S and Jacobian matrix $J_i$. For example, in case of the first embodiment, the state vector s is defined as $s=[\omega_{SC}\,\omega_{SO}\,\phi_1\ldots\phi_\tau\ldots\phi_T]^T$. Then, the same processing as the optimization calculations in the above embodiments is executed for this s.

The above embodiments are implemented under the assumption that the relative azimuth errors of each orientation sensor are different at respective times in the optimization calculations of the calibration unit 160. However, the relative azimuth error may be assumed to be constant within a short period of time in which data for calibration are acquired. For example, in case of the first embodiment, the state vector s can be defined as $s=[\omega_{SC}\,\omega_{SO}\,\phi\,t_{CO1}\ldots t_{CO\tau}\ldots t_{COT}]^T$. Then, the same processing as the optimization calculations in the above embodiments is executed for this s. Note that φ represents a correction value of the relative azimuth error independent from the time τ.

Of course, the optimization calculations using $s=[\omega_{SC}\,\omega_{SO}\,\phi]^T$ as unknown parameters can be made under both the assumptions described in this modification.

<Modification 3>

In the first embodiment, the allocation information of the orientation sensor 110 and that of the orientation sensor 115 are calculated at the same time. However, when at least one orientation sensor is already calibrated, the allocation information of the calibrated orientation sensor may be given. In this case, only the processing (step S3060) of the calibration unit 160 need to be modified.

A case will be examined below wherein the orientation sensor 115 is already calibrated, and only the orientation sensor 110 is not calibrated yet. In this case, since the allocation information $\omega_{SO}$ of the orientation sensor 115 is given, components associated with $\omega_{SO}$ can be excluded from the state vector s and Jacobian matrix $J_i$ as changes from the first embodiment. Then, the same processing as the optimization calculation in the first embodiment is executed for this s. When $\omega_{SO}$ is given, $\omega_{SC}$ can be calculated in step S4020 by:

$$R(\omega_{SC})=R_{WS\alpha\tau}^{-1}\cdot\Delta R(\phi_\tau)\cdot R_{WSb\tau}\cdot R(\omega_{SO})\cdot R'_{CO\tau}^{-1} \quad (24)$$

At this time, if a certain angle is selected as the initial value of φ, the initial value of $\omega_{SC}$ can be uniquely determined by equation (24).

Next, a case will be examined below wherein the orientation sensor 110 is already calibrated, and only the orientation sensor 115 is not calibrated yet. In this case, since the allocation information $\omega_{SC}$ of the orientation sensor 110 is given, components associated with $\omega_{SC}$ can be excluded from the state vector s and Jacobian matrix $J_i$ of the first embodiment, as in the second embodiment.

<Modification 4>

In the above embodiments, the orientation sensors 110 and 115 measure orientations of three axes. However, even when these orientation sensors are sensors which measure only inclination angles of two axes with respect to the gravity axis (such sensors are generally called as inclination sensors), the allocation information of each orientation sensor can be calculated by the same method. In this case, the parameter $\phi_\tau$ in the optimization processing represents a difference of relative azimuth angles between the image capturing apparatus 120 and physical object 125 in place of the correction value of the relative azimuth error.

<Modification 5>

In the above embodiments, indices are detected and identified by image processing. However, it is often difficult to prepare indices whose positions on the object coordinate system are given and are detectable and identifiable by the image processing, depending on the shape of the physical object 125 or the circumstances. In such case, information of each index may be manually input. That is, the operator inputs the image coordinates of the indices on the captured image displayed on the monitor using a pointing device such as a mouse or the like, and may also input the identification numbers of the indices. This method is effective if there are points whose positions on the object coordinate system are given, and the positions of which can be visually specified on an image.

When only detection of the indices can be implemented by image processing, the operator may manually execute identification processing alone. Alternatively, the operator may manually correct errors of indices which are detected and/or identified by image processing. Also, indices to be detected and/or identified by image processing, and those to be detected and/or identified by manual inputs may be used in combination.

Third Embodiment

In the above description, all the units which configure the sensor calibration apparatus 100 or 500 shown in FIG. 1 or 5 are implemented by hardware components. However, some or all of units except for the components which hold data may be implemented by software (computer program). In this case, such software is loaded onto a memory of a computer such as a PC (personal computer) or the like, and a CPU of this computer executes that software. As a result, the computer can execute the same processing as the sensor calibration apparatus 100 or 500 shown in FIG. 1 or 5.

Figure 2:
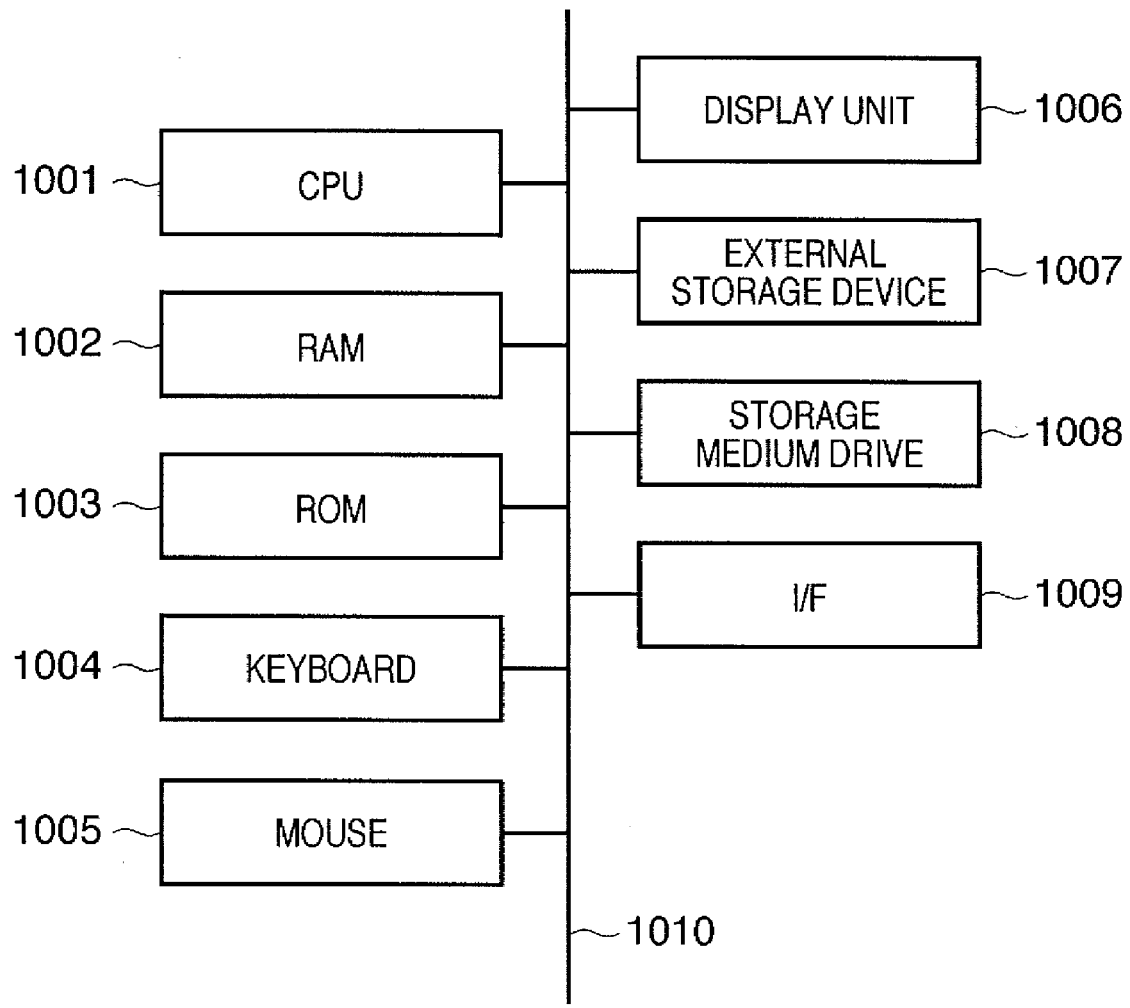
FIG. 2 is a block diagram showing the hardware arrangement of a computer which can be applied to a sensor calibration apparatus 100 or 500.

FIG. 2 is a block diagram showing the hardware arrangement of a computer which can be applied to the sensor calibration apparatuses 100 and 500.

A CPU 1001 controls the overall computer using programs and data stored in a RAM 1002 and ROM 1003, and executes the aforementioned processes to be implemented by the sensor calibration apparatus 100 or 500 to which this computer is applied.

The RAM 1002 has an area for temporarily storing programs and data loaded from an external storage device 1007 or storage medium drive 1008, and those externally received via an I/F (interface) 1009. Also, the RAM 1002 has a work area used when the CPU 1001 executes various processes. That is, the RAM 1002 can provide various areas as needed.

The ROM 1003 stores setting data, a boot program, and the like of this computer.

A keyboard 1004 and mouse 1005 are examples of input devices used by the operator of this computer to input various instructions to the CPU 1001. Other input devices may be used. For example, the operator inputs commands to the instruction unit 150 using the keyboard 1004 and/or mouse 1005.

A display unit 1006 corresponds to the display unit 190, and comprises a CRT, liquid crystal display, or the like. The display unit 1006 can display the processing results of the CPU 1001 by means of images, characters, and the like. For example, the display unit 1006 can display an image obtained by compositing the captured image and the image of the virtual object, as described above.

The external storage device 1007 is a large-capacity information storage device represented by a hard disk drive. The external storage device 1007 saves an OS (operating system), and programs and data for making the CPU 1001 execute the respective processes to be implemented by the sensor calibration apparatus 100 or 500. The external storage device 1007 also saves pieces of given information described in the above embodiments.

The programs and data saved in the external storage device 1007 are loaded onto the RAM 1002 under the control of the CPU 1001 as needed. The CPU 1001 executes processes using the loaded programs and data, thus this computer executes the aforementioned processes to be implemented by the sensor calibration apparatus 100 or 500.

The storage medium drive 1008 reads out programs and data recorded on a storage medium such as a CD-ROM, DVD-ROM, or the like, and outputs the readout programs and data to the RAM 1002 or external storage device 1007. Such storage medium may record some pieces of information which are saved in the external storage device 1007 in the above description. The storage medium may serve as the external memory 599.

To the I/F 1009, the orientation sensors 110 and 115, and the image capturing apparatus 120 are connected. The I/F 1009 is configured by the following plurality of different ports. Some of the functions of the image capturing unit 130 which captures the captured image are implemented by an analog video port or digital input/output port such as IEEE1394 or the like. Some of the functions of the orientation measurement value acquisition unit 145 are implemented by a USB port or RS-232C port. Input data are fetched to the RAM 1002 or external storage device 1007 via the I/F 1009. The allocation information of each orientation sensor calculated by the calibration unit 160 and the position and orientation of the object calculated by the position and orientation calculation unit 170 are externally output via an Ethernet™ port or the like (some of the functions of the I/F 1009), as needed.

Reference numeral 1010 denotes a bus which interconnects the aforementioned units.

Note that the hardware arrangement of the computer which is applicable to the sensor calibration apparatus 100 or 500 is not limited to that shown in FIG. 2, and such hardware arrangement may be modified as needed by those who are skilled in the art.

Other Embodiments

The objects of the present invention can be achieved as follows. That is, a recording medium (or storage medium), which records a program code of software that can implement the functions of the above-mentioned embodiments is supplied to a system or apparatus. Of course, the storage medium is a computer-readable storage medium. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-105249, filed Apr. 12, 2007, which is hereby incorporated by reference herein in its entirety.

What is claimed is:

1. An information processing apparatus comprising:
an orientation measurement value acquisition unit adapted to acquire (a) an orientation measurement value measured by an orientation sensor for an image capturing apparatus mounted on the image capturing apparatus, and (b) an orientation measurement value measured by an orientation sensor for a physical object mounted on the physical object to be captured by the image capturing apparatus;
an image acquisition unit adapted to acquire an image of the physical object captured by the image capturing apparatus;
an image coordinate acquisition unit adapted to acquire image coordinates on the image of indices allocated on the physical object;
a setting unit adapted to set a given value as an initial value of a relative value between (a) an azimuth error included in the orientation measurement value of the orientation sensor for the image capturing apparatus and (b) an azimuth error included in the orientation measurement value of the orientation sensor for the physical object; and
a calculation unit adapted to calculate both of (a) allocation information of the orientation sensor for the image capturing apparatus with respect to the image capturing apparatus, and (b) allocation information of the orientation sensor for the physical object with respect to the physical object, using the orientation measurement value measured by the orientation sensor for the image capturing apparatus, the orientation measurement value measured by the orientation sensor for the physical object, the image coordinates, and the given value being updated repeatedly during calculating both of the allocation information.

2. The apparatus according to claim 1, wherein said orientation measurement value acquisition unit acquires orientation measurement values measured by the orientation sensor for the image capturing apparatus and orientation measurement values measured by the orientation sensor for the physical object every time the image capturing apparatus and the physical object take a plurality of different orientations, wherein said image acquisition unit acquires images captured by the image capturing apparatus every time the image capturing apparatus and the physical object take the plurality of different orientations, wherein said image coordinate acquisition unit acquires image coordinates of the indices from each of the images acquired by said image acquisition unit, and wherein said calculation unit calculates both of (a) the allocation information of the orientation sensor for the image capturing apparatus with respect to the image capturing apparatus, and (b) the allocation information of the orientation sensor for the physical object with respect to the physical object, using the orientation measurement values measured by the orientation sensor for the image capturing apparatus, the orientation measurement values measured by the orientation sensor for the physical object, the image coordinates of the indices acquired from the images captured by the image capturing apparatus, which are acquired every time the image capturing apparatus and the physical object take the plurality of different orientations, and the given value being updated repeatedly during calculating both of the allocation information.

3. The apparatus according to claim 2, wherein said calculation unit sets, as unknown parameters, parameters to be calculated of the allocation information of the orientation sensor for the image capturing apparatus with respect to the image capturing apparatus, and the allocation information of the orientation sensor for the physical object with respect to the physical object, and calculates the unknown parameters so as to reduce errors between coordinates of the indices on an image determined based on the unknown parameters, and the image coordinates acquired by said image coordinate acquisition unit in correspondence with the indices.

4. The apparatus according to claim 1, further comprising:
a unit adapted to generate an image of a virtual object based on the allocation information calculated by said calculation unit;
a unit adapted to generate a superimposed image obtained by superimposing the image of the virtual object on an image captured by the image capturing apparatus; and
a unit adapted to display the superimposed image.

5. An information processing method comprising:
acquiring an orientation measurement value measured by an orientation sensor for an image capturing apparatus mounted on the image capturing apparatus, and an orientation measurement value measured by an orientation sensor for a physical object mounted on the physical object to be captured by the image capturing apparatus;
acquiring an image of the physical object captured by the image capturing apparatus;
acquiring image coordinates on the image of indices allocated on the physical object;
setting a given value as an initial value of a relative value between (a) an azimuth error included in the orientation measurement value of the orientation sensor for the image capturing apparatus and (b) an azimuth error included in the orientation measurement value of the orientation sensor for the physical object; and
calculating both of (a) allocation information of the orientation sensor for the image capturing apparatus with respect to the image capturing apparatus, and (b) allocation information of the orientation sensor for the physical object with respect to the physical object, using the orientation measurement value measured by the orientation sensor for the image capturing apparatus, the orientation measurement value measured by the orientation sensor for the physical object, the image coordinates, and the given value being updated repeatedly during calculating both of the allocation information.

6. A non-transitory computer-readable storage medium storing a computer program for making a computer execute an information processing method, the method comprising:
acquiring an orientation measurement value measured by an orientation sensor for an image capturing apparatus mounted on the image capturing apparatus, and an orientation measurement value measured by an orientation sensor for a physical object mounted on the physical object to be captured by the image capturing apparatus;
acquiring an image of the physical object captured by the image capturing apparatus;
acquiring image coordinates on the image of indices allocated on the physical object;
setting a given value as an initial value of a relative value between (a) an azimuth error included in the orientation measurement value of the orientation sensor for the image capturing apparatus and (b) an azimuth error included in the orientation measurement value of the orientation sensor for the physical object; and
calculating both of (a) allocation information of the orientation sensor for the image capturing apparatus with respect to the image capturing apparatus, and (b) allocation information of the orientation sensor for the physical object with respect to the physical object, using the orientation measurement value measured by the orientation sensor for the image capturing apparatus, the orientation measurement value measured by the orientation sensor for the physical object, the image coordinates, and the given value being updated repeatedly during calculating both of the allocation information.

* * * * *